United States Patent [19]

Sasaki

[11] Patent Number: 5,671,893
[45] Date of Patent: Sep. 30, 1997

[54] DATA CARTRIDGE

[75] Inventor: Kazuo Sasaki, Miyagi, Japan

[73] Assignee: Sony Corporation, Tokyo, Japan

[21] Appl. No.: 668,749

[22] Filed: Jun. 24, 1996

[30] Foreign Application Priority Data

Jun. 26, 1995 [JP] Japan .................................. 7-180562

[51] Int. Cl.$^6$ ........................... G11B 23/087; G11B 23/04
[52] U.S. Cl. ..................... 242/342; 242/345; 242/346.2; 242/347
[58] Field of Search ............................. 242/345, 342, 242/347, 348, 346.2, 352.4; 360/132

[56] References Cited

U.S. PATENT DOCUMENTS 3,735,940  5/1973  Schwartz ........................... 242/346.2

Primary Examiner—John Q. Nguyen
Attorney, Agent, or Firm—William S. Frommer; Alvin Sinderbrand

[57] ABSTRACT

A data cartridge for use for example in an external memory unit for backing up a computer in which it is possible to secure a smooth surface quality of an upper surface of a base plate in base contact areas with which rotating parts and other mechanism parts of the data cartridge make base contact. In the upper surface 3b of an aluminum base plate 3, a plurality of base contact areas TA of rotating parts RP and other mechanism parts MP such as tape reels, a drive roller, a corner roller and a mirror for optical detection of tape ends are partially surface-pressed to form a plurality of recesses 3c having smooth surfaces free of scratches. As a result, smooth rotation of rotating parts mounted on the base plate and making base contact with the smooth surfaces of the recesses 3c and good contact quality of other mechanism parts with respect to the base plate can be secured and high-precision mounting of these rotating parts RP and other mechanism parts MP can be carried out, a stable tape path and smooth transport of the magnetic tape can be obtained, recording and reproduction errors can be prevented and a highly reliable magnetic tape can be produced with a low-cost and simple manufacturing process.

5 Claims, 17 Drawing Sheets

DATA CARTRIDGE

BACKGROUND OF THE INVENTION

This invention relates to a data cartridge used in a magnetic recording and reproducing apparatus ideal for use for example as an external memory unit for backing up a computer (CPU), and particularly to a metal base plate.

Data cartridges of this kind in the related art include for example that disclosed in U.S. Pat. No. 3,692,255.

As shown in FIG. 1 to FIG. 4, this kind of related art data cartridge 1 comprises a cartridge 2 constituted in a substantially rectangular flat box shape by a base plate 3 consisting of a flat plate of a metal such as aluminum and an upper cover 4 made of a transparent synthetic resin such as polycarbonate resin.

In the upper cover 4, a front wall 4a, a back wall 4b, left and right side walls 4c and a ceiling wall 4d are formed integrally with each other and the underside is open. Lower ends of four pairs of downwardly extending provisional fixing ribs 5 formed integrally with the underside of the ceiling wall 4d at four locations near the corners thereof, eight ribs in total, are lightly press-fitted in fastening holes 6 formed at four corresponding locations in the base plate 3 and the upper cover 4 is thereby provisionally fixed to the base plate 3. Two screws 8 passed through screw insertion holes 7 formed at two locations near the front and back of the base plate 3 respectively and central in the left-right direction thereof are then screwed into downwardly extending screw fixing bosses 9 formed integrally with the underside of the ceiling wall 4d of the upper cover 4 at two corresponding locations and the upper cover 4 is thereby fixed to the base plate 3.

A capstan roller insertion opening 11 is formed in a part of the front wall 4a of this cartridge 2 substantially central in the left-right direction, and a magnetic head insertion opening 12 is formed to the left of this capstan roller insertion opening 11.

Inside this cartridge 2, a drive roller 13 is disposed on the inner side of the magnetic head insertion opening 12 and a left-right pair of corner rollers 14 are disposed in the left and right back corners formed by the back wall 4b and the left and right side walls 4c. The drive roller 13 and the left-right pair of corner rollers 14 are made of synthetic resin or the like and are severally rotatably mounted on three support shafts 15 made of metal or the like vertically embedded in the base plate 3 by for example press-fitting and make base contact with the base plate 3.

The drive roller 13 comprises a large diameter roller part 13a and a small diameter roller part 13b formed integrally as two upper and lower steps, and a part of the large diameter roller part 13a is exposed in the top of the capstan roller insertion opening 11 in the front wall 4a.

Inside this cartridge 2, a left-right pair of tape reels 17 with upper and lower flanges are disposed in positions substantially central in the front-rear direction. These tape reels 17 are made of synthetic resin or the like and are severally rotatably mounted on three support shafts 18 made of metal or the like vertically embedded in the base plate 3 by for example press-fitting and make base contact with the base plate 3.

A left-right pair of tape guides 19 with upper and lower flanges are disposed inside the cartridge 2 near the left and right front corners thereof, and a flangeless tape guide 20 is disposed on one side of the inner side of the capstan roller insertion opening 11. These tape guides 19 and 20 are made of metal or the like and are vertically embedded in the base plate 3 by press-fitting or the like.

The ends of a magnetic tape 21 are wound on the left-right pair of tape reels 17, and this magnetic tape 21 is strung along the inner side of the front wall 4a crossing the inner sides of the capstan roller insertion opening 11 and the magnetic head insertion opening 12 and guided by the total of three tape guides 19 and 20.

An elastic drive belt 22 consisting of a urethane belt or the like is fitted around the small diameter roller part 13b of the drive roller 13 and the left-right pair of corner rollers 14 in an approximate T-shape and in a strongly pretensioned state. A left-right pair of tape driving portions 22a of this drive belt 22 extending between the drive roller 13 and the left-right pair of corner rollers 14 are respectively in pressing contact with the outer peripheries of wound tape portions 21a of the magnetic tape 21 wound on the left-right pair of tape reels 17.

The magnetic head insertion opening 12 of the cartridge 2 is cut out in an approximate trapezoid shape so that it extends between the base plate 3 and the ceiling wall 4d of the upper cover 4, and an opening and closing lid 24 a part of which is formed cross-sectionally C-shaped so that it can open and close this magnetic head insertion opening 12 is mounted pivotally in the directions of the arrows a and b about a pivot shaft 25 made of metal or the like and vertically embedded in the base plate 3 by press-fitting or the like and makes base contact with the base plate 3. This opening and closing lid 24 is urged to pivot in the direction of the arrow b, which is the direction in which it closes, by a coil spring 26 press-fitted onto the pivot shaft 25.

Inside the cartridge 2, a mirror 27 for optical detection of the tape ends is disposed to the right of the drive roller 13 near the front right side corner of the cartridge 2. This mirror 27 is made of a transparent synthetic resin such as acrylic resin or the like and is mounted making base contact with the base plate 3 and sandwiched from above by the upper cover 4 so that it blocks a light-passing hole 28 formed in the base plate 3.

A sliding accidental erasure preventing claw 29 is fitted to the right side end of the front end of the ceiling wall 4d of the upper cover 4.

A left-right pair of long channels 30 each cut in from the front end 2a to a position near the back end 2b of the cartridge 2 are formed in parallel in the left and right side walls 4c of the upper cover 4 of the cartridge 2. A left-right pair of rectangular cutaways 31 for positioning are formed in the front ends of left and right ends 3a of the base plate 3 in these channels 30.

Next, as shown in FIG. 5 and FIG. 6, a magnetic recording and reproducing apparatus 41 used as an external memory unit for backing up a computer (CPU) has a rectangular cartridge insertion opening 43 formed in a front panel 42 and has built therein a capstan roller 45 consisting of a rubber roller or the like rotationally driven by a spindle 44a of a spindle motor 44, a magnetic head 46 and means for guiding the insertion of and positioning a data cartridge 1 and means for opening the opening and closing lid 24 which will be further discussed later.

When a data cartridge 1 is loaded from its front end 2a in the direction of the arrow c into the cartridge insertion opening 43 of the magnetic recording and reproducing apparatus 41, the opening and closing lid 24 opens about the pivot shaft 25 in the direction of the arrow a against the resistance of the coil spring 26 and the capstan roller 45 and the magnetic head 46 are inserted relatively in the direction of the arrow d into the capstan roller insertion opening 11 and the magnetic head insertion opening 12 of the data cartridge 1.

The capstan roller 45 is then pressed in the direction of the arrow d against the large diameter roller part 13a of the drive roller 13 by a pressing spring (not shown) and the magnetic head 46 is brought into contact in the direction of the arrow d with the magnetic tape 21 between the tape guides 19 and 20.

Then, when as shown in FIG. 1 the capstan roller 45 is rotationally driven in the direction of the arrow e by the spindle motor 44 and the drive roller 13 is rotationally driven in the direction of the arrow f by the capstan roller 45, the drive belt 22 is rotationally driven in the direction of the arrow g by the drive roller 13.

When this happens, the left-right pair of tape reels 17 are frictionally driven in the direction of the arrow g by the left-right pair of tape driving portions 22a of the drive belt 22 by way of the wound tape portions 21a.

The magnetic tape 21 is then transported between the left-right pair of tape guides 19 in the direction of the arrow h from the left side tape reel 17 to be taken up on the right side tape reel 17 and data from a computer (CPU) is recorded on or reproduced from the magnetic tape 21 by the magnetic head 46.

In a conventional magnetic recording and reproducing apparatus 41, a shallow rectangular box is made up of a cross-sectionally substantially U-shaped chassis 47 made of synthetic resin or the like and a cross-sectionally substantially inverted-U-shaped upper cover 48 made of sheet metal or the like removably fitted to the chassis 47 from above, and a transversely long rectangular front panel 42 made of synthetic resin or the like is removably fitted to the front of this box.

An opening and closing lid 49 for opening and closing a transversely long rectangular cartridge insertion opening 43 formed in the front panel 42 is mounted on the inner side of the cartridge insertion opening 43 pivotally about the upper end of this opening and closing lid 49 in the directions of the arrows i and j in FIG. 6. This opening and closing lid 49 is urged by urging means (not shown) to close in the direction of the arrow j.

The capstan roller 45 and the spindle motor 44 are mounted movably within a fixed range in the directions of the arrows c and d on a bottom wall 47a of the chassis 47, and the capstan roller 45 and the spindle motor 44 are urged to move in the direction Of the arrow d by strong urging means.

A left-right pair of cartridge insertion guides 50 left-right symmetrical in shape are integrally formed horizontally and in parallel along lower parts near the front end, which is the front panel 42 end, of inner sides of a left-right pair of side walls 47b of the chassis 47.

Horizontal undersides of the left-right pair of cartridge insertion guides 50 are formed as vertical direction reference surfaces 51 for vertical positioning of an inserted data cartridge 1, and cartridge insertion stoppers 52 are formed vertically on the undersides of the rear ends, which are the opposite ends from the front panel 42, of the left-right pair of cartridge insertion guides 50.

Below the left-right pair of cartridge insertion guides 50, a left-right pair of cartridge positioning rollers 53 are disposed in positions near the left-right pair of cartridge insertion stoppers 52. The left-right pair of cartridge positioning rollers 53 are supported movably in the directions of the arrows m and n in FIG. 6, which are upward and downward directions, and urged to move in the direction of the arrow m, which is an upward direction, by linear springs 54, which are urging means.

Also, an elastic pressing arm 55 for elastically urging the inserted data cartridge 1 upward is formed integrally with the bottom wall 47a of the chassis 47 in the vicinity of the front panel 42.

In a conventional magnetic recording and reproducing apparatus 41 constructed as described above, when a data cartridge 1 is inserted from its front end 2a into the cartridge insertion opening 43 in the direction of the arrow c, it pushes open the opening and closing lid 49 in the direction of the arrow j, which is the opening direction, against the resistance of the urging means.

Then, the left-right pair of cartridge insertion guides 50 are relatively inserted in the direction of the arrow d into the left-right pair of channels 30 of the data cartridge 1 inserted into the cartridge insertion opening 43 in the direction of the arrow c.

In the initial stage of this insertion of the data cartridge 1 in the arrow c direction, the free end 24a of the opening and closing lid 24 of the data cartridge 1 abuts with the front end 50a of one of the cartridge insertion guides 50 and this free end 24a mounts an inner side surface 50b of that cartridge insertion guide 50 and the opening and closing lid 24 is thereby instantaneously opened about the pivot shaft 25 in the arrow a direction against the resistance of the coil spring 26 and the magnetic head insertion opening 12 is opened.

Along with the insertion of this data cartridge 1 in the arrow c direction, the base plate 3 of the data cartridge 1 mounts the elastic pressing arm 55 of the bottom wall 47a of the chassis 47 and while the left and right ends 3a of the base plate 3 are elastically pushed from below against the vertical direction reference surfaces 51 of the left-right pair of cartridge insertion guides 50 the data cartridge 1 is inserted in the arrow c direction.

When this insertion of the data cartridge 1 in the arrow c direction is complete, the left and right ends 3a of the base plate 3 abut with the left-right pair of cartridge insertion stoppers 52 and the data cartridge 1 is stopped and the left and right ends 3a of the base plate 3 have mounted the left-right pair of cartridge positioning rollers 53.

At this time, the left-right pair of cartridge positioning rollers 53 sink once in the arrow n direction against the resistance of the linear springs 54 and then are pushed up in the arrow m direction by the reaction force of the linear springs 54 and engage with the insides of the left-right pair of positioning cutaways 31 of the base plate 3 in the arrow m direction. This left-right pair of cartridge positioning rollers 53 then strongly press in the arrow m direction against the front end edges 31a of the left-right pair of cutaways 31.

In this way, the data cartridge 1 is correctly positioned by the left and right ends 3a of the base plate 3 thereof being pushed against the left-right pair of cartridge insertion stoppers 52 in the arrow c direction and the left-right pair of vertical direction reference surfaces 51 being pushed in the arrow m direction.

By completion of the insertion of the data cartridge 1 in the arrow c direction the magnetic head 46 is relatively inserted into the magnetic head insertion opening 12 of the data cartridge 1 in the arrow d direction and is brought into contact with the magnetic tape 21 and the drive roller 13 of the data cartridge 1 is strongly pressed against the capstan roller 45 in the arrow c direction against the resistance of the strong urging means.

In a conventional data cartridge 1 constructed and operated as described above, a plurality of rotating parts RP inside the cartridge 2 such as the drive roller 13, the corner rollers 14 and the tape reels 17 are all mounted on the base plate 3 and the drive belt 22 is fitted around the drive roller 13, the corner rollers 14 and the pair of wound tape portions 21a with a strong tension.

Therefore, to secure smooth rotation of these rotating parts RP and a stable tape path of the magnetic tape 21, it is necessary to provide the base plate 3 with ample rigidity. Furthermore, with respect to the plurality of support shafts 15 and 18, the tape guides 19 and 20 and the pivot shaft 25 embedded in the base plate 3 also, their verticality, height accuracy and fixing strength must be secured with high precision.

In this connection, in a conventional data cartridge 1, the base plate 3 is made of a metal such as aluminum plate, the support shafts 15 and 18, the tape guides 19 and 20 and the pivot shaft 25 are made of a high-strength stainless steel material or the like and the support shafts 15 and 18, the tape guides 19 and 20 and the pivot shaft 25 are all vertically embedded in the base plate 3 at once by means of a forging press 61 shown in FIG. 7.

In the forging press 61 shown in FIG. 7, a plurality of punches 63 having different diameters are vertically fixed to the underside of a press machine proper 62 by a fixing plate 64, the lower ends of these punches 63 pass through a movable push plate 65 and a plurality of compression springs 66 are interposed between the fixing plate 64 and the movable push plate 65.

The base plate 3 is placed horizontally on a base plate 67 of the forging press 61 by way of a plurality of bearers 68, and the shafts 15 and 18, the tape guides 19 and 20 and the pivot shaft 25 are held by an embedding jig 69 so that they are each disposed vertically in a predetermined position on the base plate 3.

Then, by the support shafts 15 and 18, the tape guides 19 and 20 and the pivot shaft 25 being simultaneously driven into the base plate 3 by the plurality of punches 63 with the press machine proper 62, holes are made by the base plate 3 being punched downward by the lower ends of the support shafts 15 and 18, the tape guides 19 and 20 and the pivot shaft 25 and an embedding step of press-fitting these lower ends into these holes is carried out at the same time.

With respect to the tape guides 19 with upper and lower flanges, a press-fitting shaft 19d formed integrally with the lower end thereof is driven into the base plate 3 from above and a hole is made by the base plate 3 being punched downward by this press-fitting shaft 19d and the press-fitting shaft 19d is press-fitted in this hole at the same time.

A plurality of rotating parts RP such as the drive roller 13, the corner rollers 14 and the tape reels 17 are severally fitted onto the plurality of support shafts 15 and 18 as shown in FIG. 8 and rotate on the support shafts 15 and 18 with base contact surfaces $RP_1$ of the lower ends of these rotating parts RP making base contact with the upper surface 3b of the base plate 3.

Consequently, to obtain smooth rotation of these rotating parts RP, a smooth surface characteristic with no fine irregularities is required in the base contact areas TA in the upper surface 3b of the base plate 3 with which the base contact surfaces $RP_1$ of the rotating parts RP severally make base contact as they rotate.

Furthermore, also with respect to mechanism parts MP such as the mirror 27 for optical detection of the tape ends, because they must be fitted in contact with the upper surface 3b of the base plate 3, a smooth surface characteristic with no fine irregularities is also required in the base contact areas TA in the upper surface 3b of the base plate 3 with which the mechanism parts MP make base contact.

To ensure the quality of these parts, in the related art, in a stage in a data cartridge production line before the step of embedding the support shafts 15 and 18, the tape guides 19 and 20 and the pivot shaft 25 in the base plate 3, the following kind of pretreatment step has been carried out.

That is, in a case wherein the base plate 3 is stamped from an ordinary aluminum starting sheet, as shown in FIG. 9 and FIG. 10, a surface grinding (polishing) step is carried out wherein while base plates 3 are transported by means of a conveyor 81, using a rotary grindstone 82 and with water being applied by a water sprayer 83, the upper surfaces 3b of these base plates 3 are ground (polished), and after this, to surface-harden the base plates 3, alumite treatment or the like is carried out.

However, methods wherein the upper surfaces 3b of the base plates 3 are ground (polished) one at a time are troublesome, consumption of the rotary grindstone 82 is great, the process time is long and the process also markedly increases cost. Furthermore, working distortion 84 tends to occur due to heat created during the process, as shown in FIG. 10, and consequently there are quality problems also.

For this reason, as a method for reducing cost by simplifying the process, there is a method wherein the base plate 3 is directly punched from a starting sheet 85 of a pre-alumited material or a coated aluminum material already coated with a protective layer, as shown in FIG. 11, and the surface grinding (polishing) step illustrated in FIG. 9 and FIG. 10 can be dispensed with.

The upper surface 3b of a base plate 3 obtained in this way is smooth, having a surface roughness Ra of about 0.01 to 0.03 μm.

However, hitherto, for reasons such as the base plate 3 starting sheet itself being scratched, the upper surface 3b of the base plate 3 being scratched by a mold or the like when the base plate 3 is stamped from the starting sheet and the upper surface 3b of the base plate 3 being scratched as a result of base plates 3 scraping together during carrying of the base plates 3, numerous scratch projections 86 tend to form on the upper surface 3b of the base plate 3, as shown in FIG. 12B.

At this time, when scratch projections 86 form in the upper surface 3b of the base plate 3 in the base contact areas TA of the rotating parts RP and the mechanism parts MP, as shown in FIG. 12B and FIG. 13, the base contact surfaces $RP_1$ of the rotating parts RP make contact with these scratch projections 86 and deviation arises in the height and the verticality of the rotating parts RP and smooth rotation thereof cannot be obtained. In the case of the mechanism parts MP also, due to the scratch projections 86, quality of their contact with the upper surface 3b of the base plate 3 is lost.

As a result it is not possible to obtain a stable tape path and smooth tape transport of the magnetic tape 21 and fatal problems arise such as that recording and reproducing errors occur and it becomes impossible to carry out optical detection of the tape ends of the magnetic tape 21.

SUMMARY OF THE INVENTION

The invention was devised to solve the problems described above, and an object of the invention is to provide a data cartridge in which it is possible to secure a smooth surface quality in base contact areas with which rotating parts and other mechanism parts make base contact in an upper surface of a base plate.

In a data cartridge of the invention for achieving the above-mentioned object and other objects, in an upper surface of a metal base plate, a plurality of base contact areas of a plurality of rotating parts and other mechanism parts such as tape reels, a drive roller, corner rollers and a mirror for optical detection of tape ends are partially surface-pressed to form a plurality of recesses.

With a data cartridge of the invention constructed as described above, even if there are scratch projections in the plurality of base contact areas of the plurality of rotating parts and other mechanism parts in the upper surface of the base plate, by partially surface-pressing these base contact areas and thereby forming a plurality of recesses, the scratch projections can be squashed and smooth surfaces can be formed in the base contact areas. Also, scratch projections do not readily form in the plurality of recesses formed in the plurality of base contact areas after that, and stable quality can therefore be ensured.

DETAILED DESCRIPTION OF THE PREFERRED EMBODIMENTS

A preferred embodiment of a data cartridge to which the invention has been applied will now be described with reference to FIG. 14 through FIG. 17B. Parts the same as in FIG. 1 through FIG. 13 have been given the same reference numbers and will not be described again hereinafter.

DESCRIPTION OF BASE PLATE PROCESSING PROCEDURE

First, the processing procedure of the base plate 3 in a data cartridge 1 of the invention will be described.

First, the base plate 3 is punched from a starting sheet of a pre-alumited material already treated with alumite or a coated aluminum material.

Figure 15:
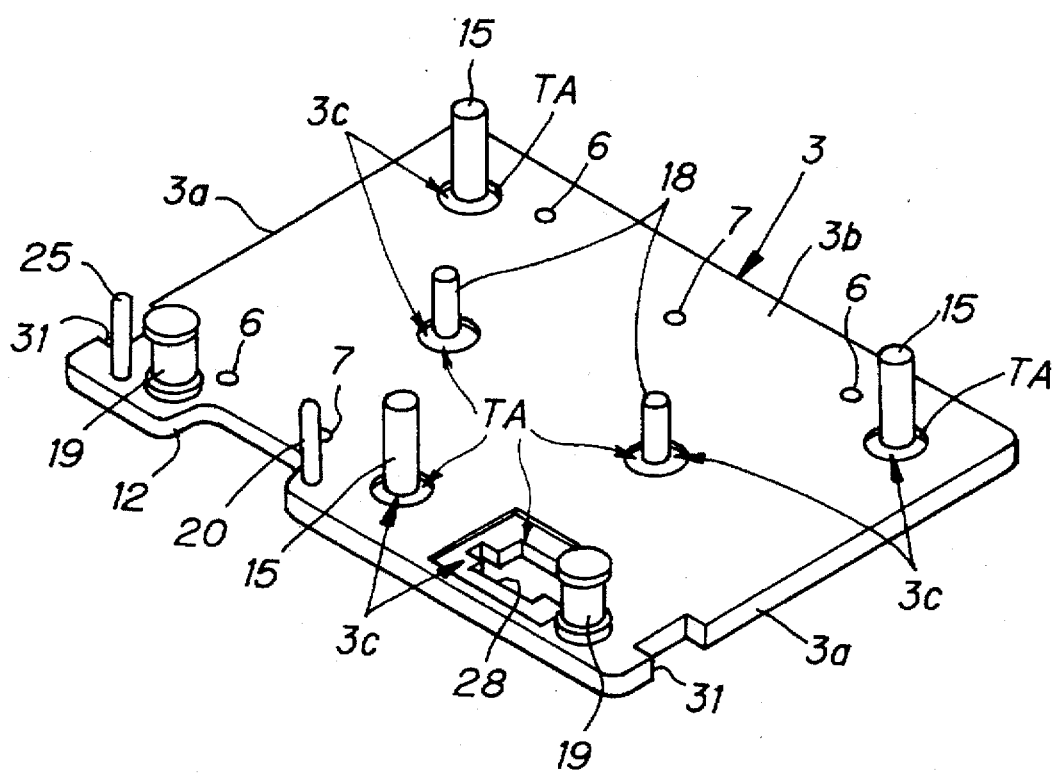
FIG. 15 is a perspective view showing the whole of a base plate in the upper surface of which a plurality of recesses have been formed by partial surface-pressing.

Then, as shown in FIG. 15, a plurality of base contact areas TA in the upper surface 3b of the base plate 3 with which among the plurality of mechanism parts MP particularly rotating parts RP and other mechanism parts MP such as the drive roller 13, the corner rollers 14, the tape reels 17 and the mirror 27 make base contact are partially surface-pressed to form a plurality of recesses 3c.

Figure 1:
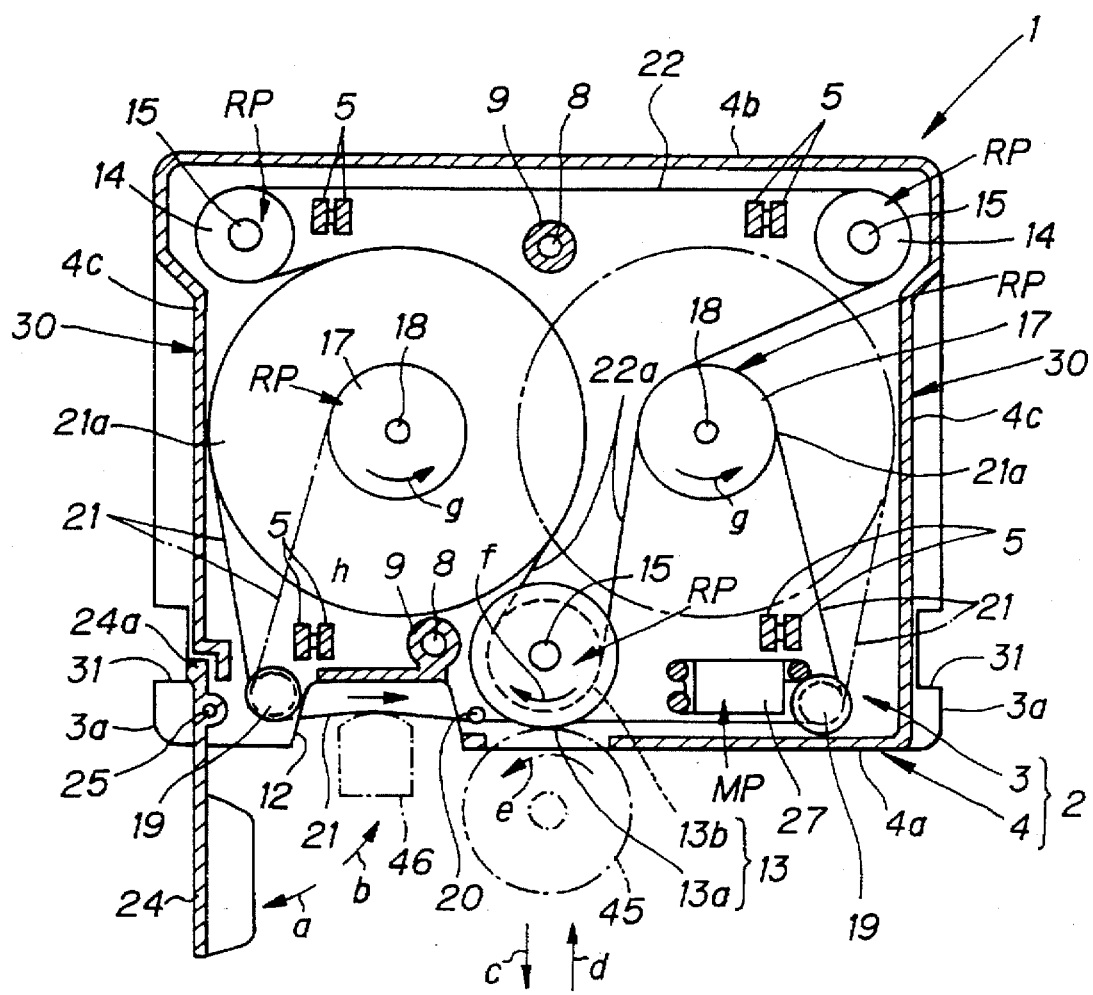
FIG. 1 is a partial cutaway plan view of a data cartridge.
Figure 2:
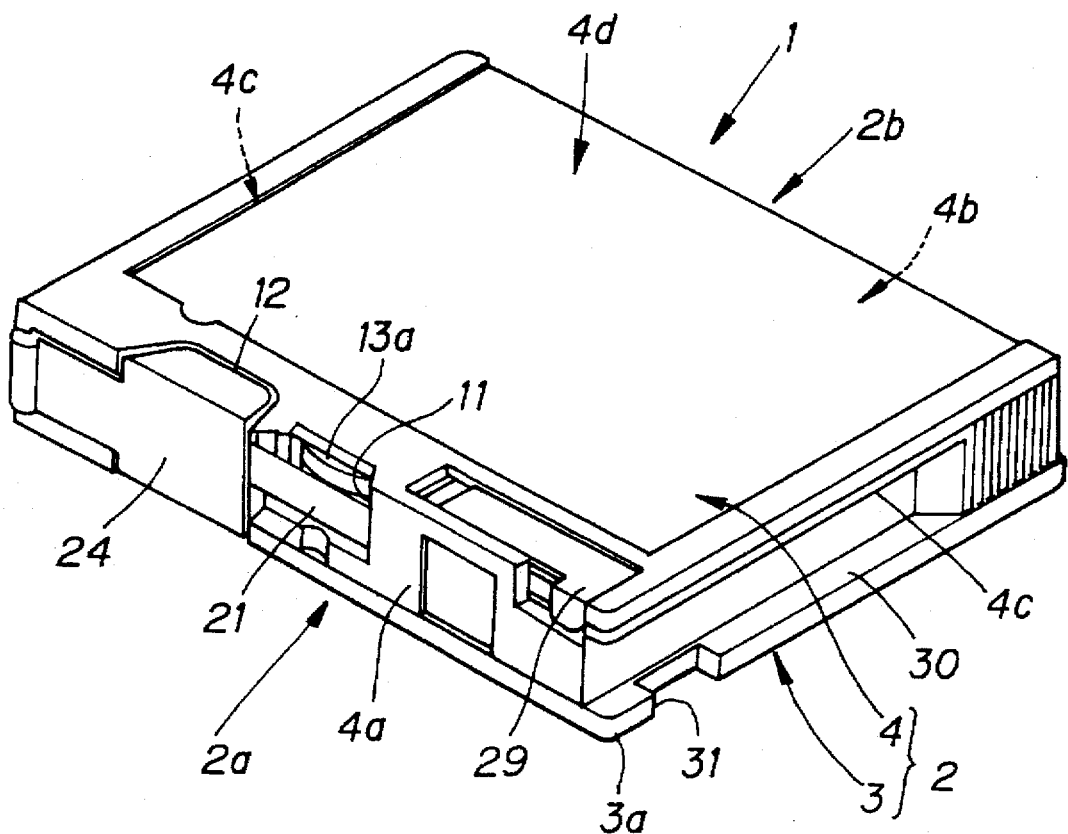
FIG. 2 is a perspective view of the data cartridge.
Figure 3:
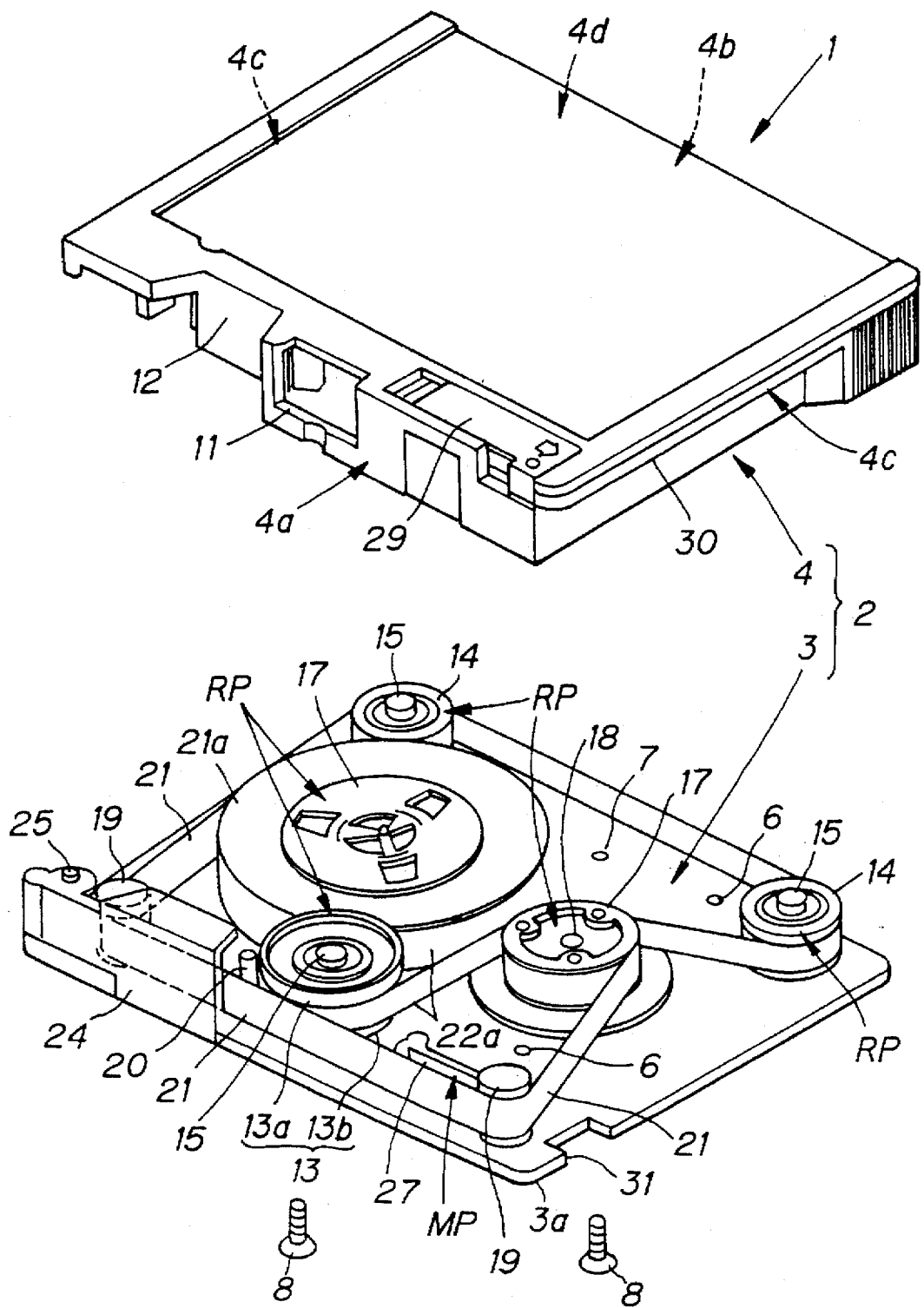
FIG. 3 is a perspective view of the data cartridge with an upper cover thereof removed.
Figure 4:
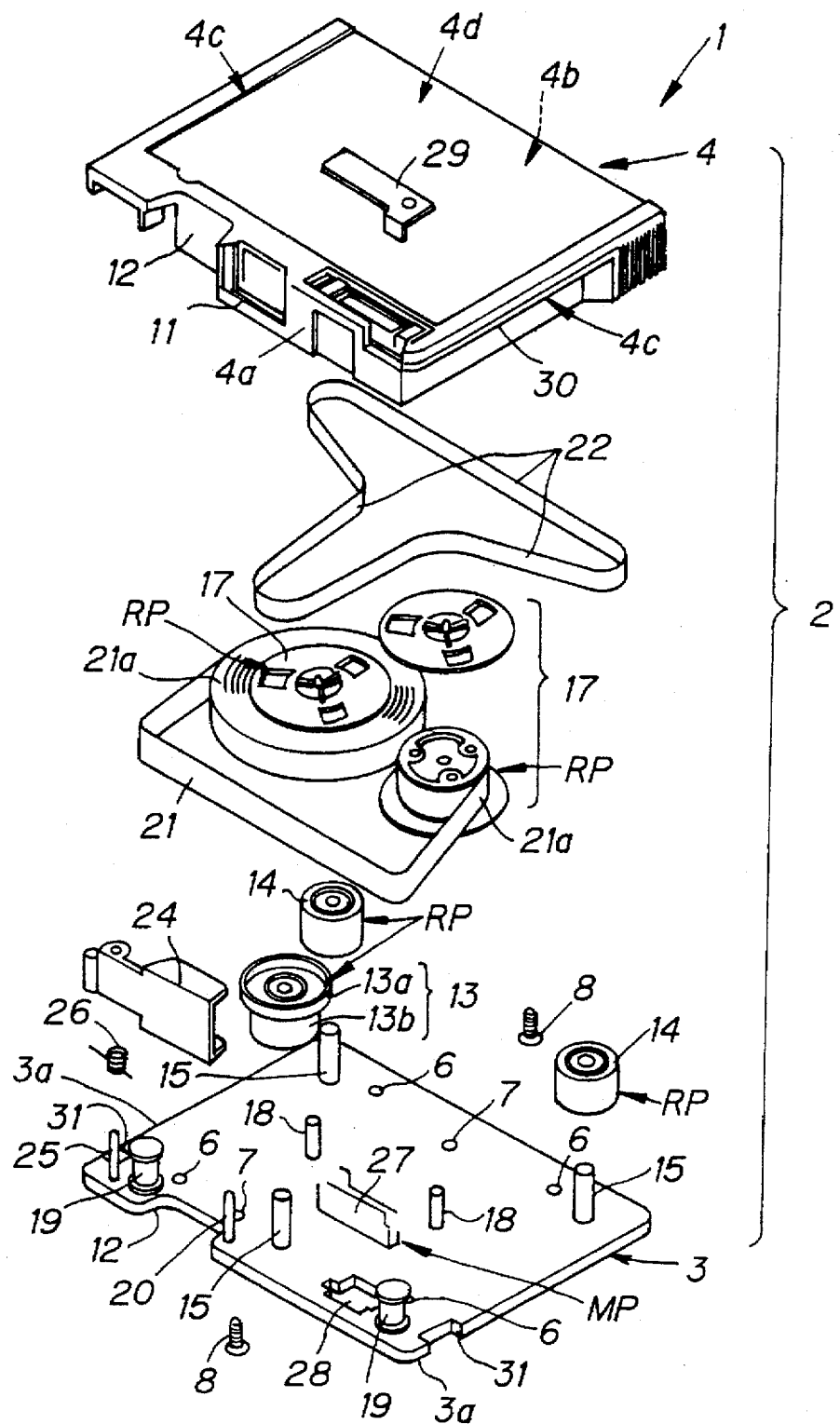
FIG. 4 is an exploded perspective view of the whole data cartridge.
Figure 5:
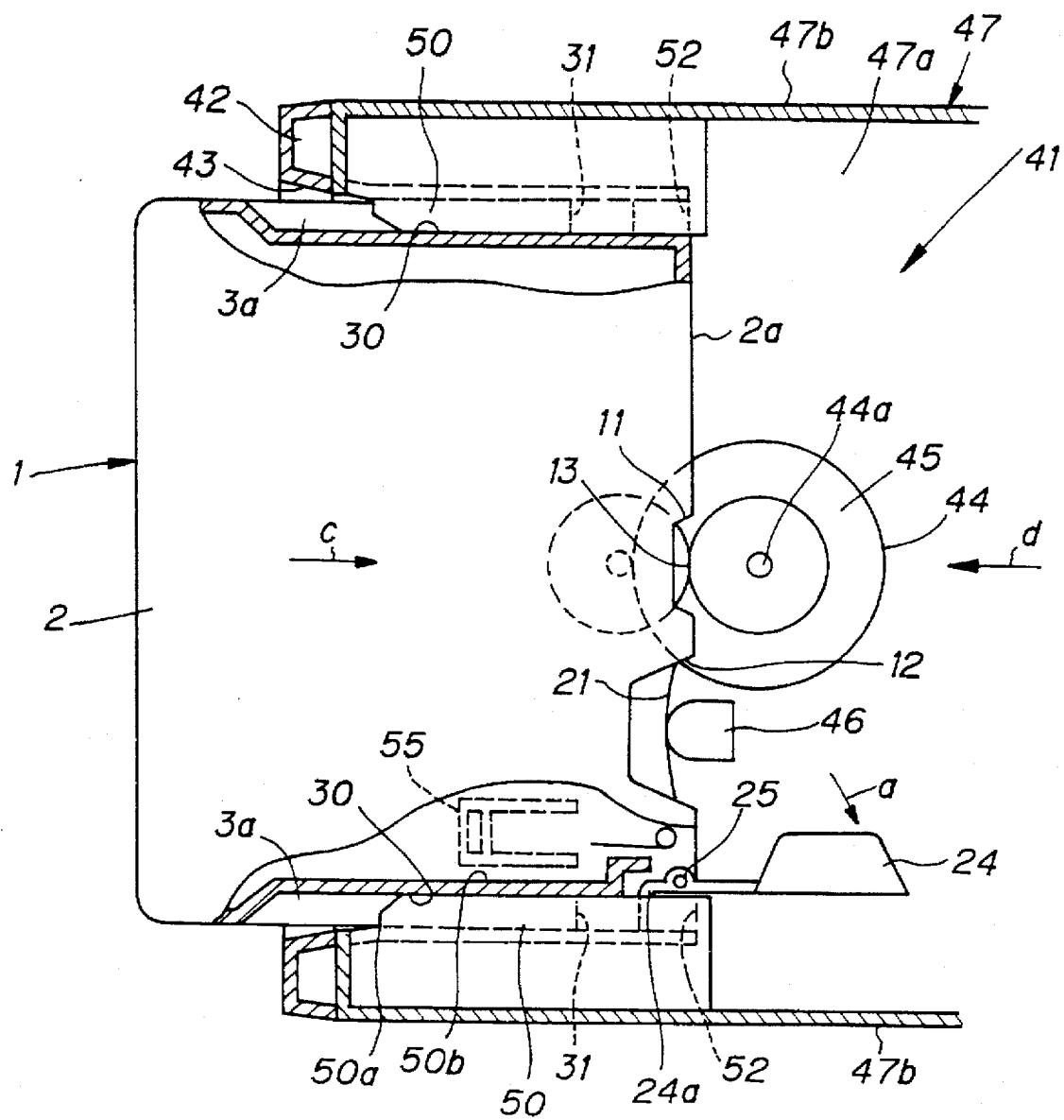
FIG. 5 is a partial cutaway plan view illustrating a magnetic recording and reproducing apparatus in which the data cartridge is used.
Figure 6:
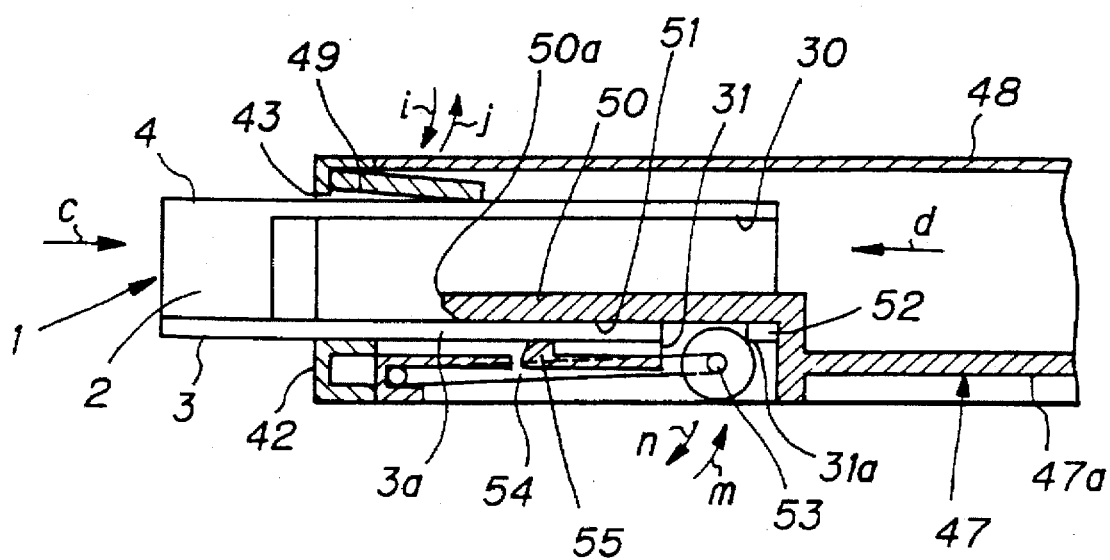
FIG. 6 is a sectional side view of the magnetic recording and reproducing apparatus.
Figure 7:
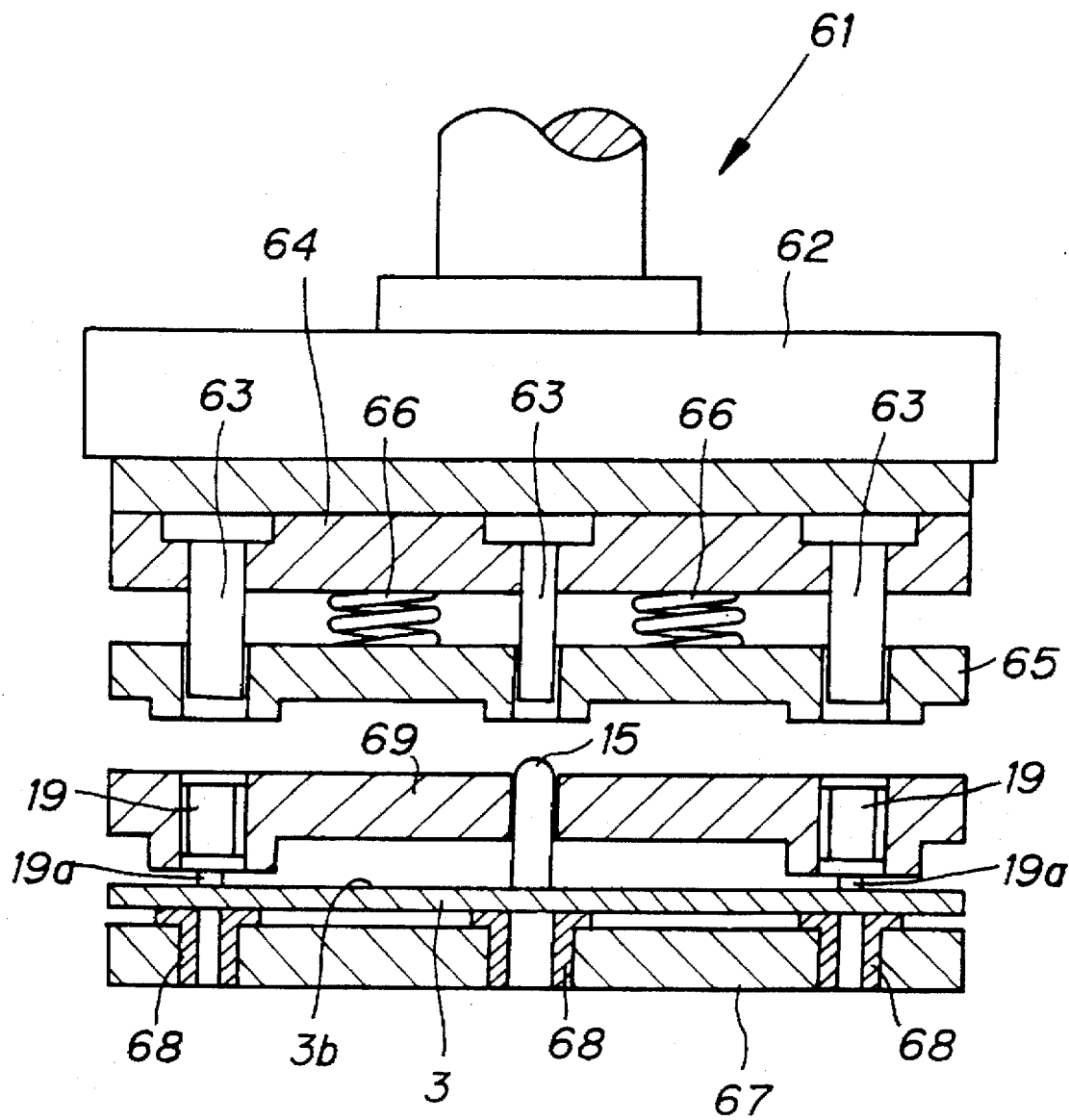
FIG. 7 is a sectional side view illustrating a forging press for embedding support shafts and tape guides with upper and lower flanges into a base plate of the data cartridge.
Figure 8:
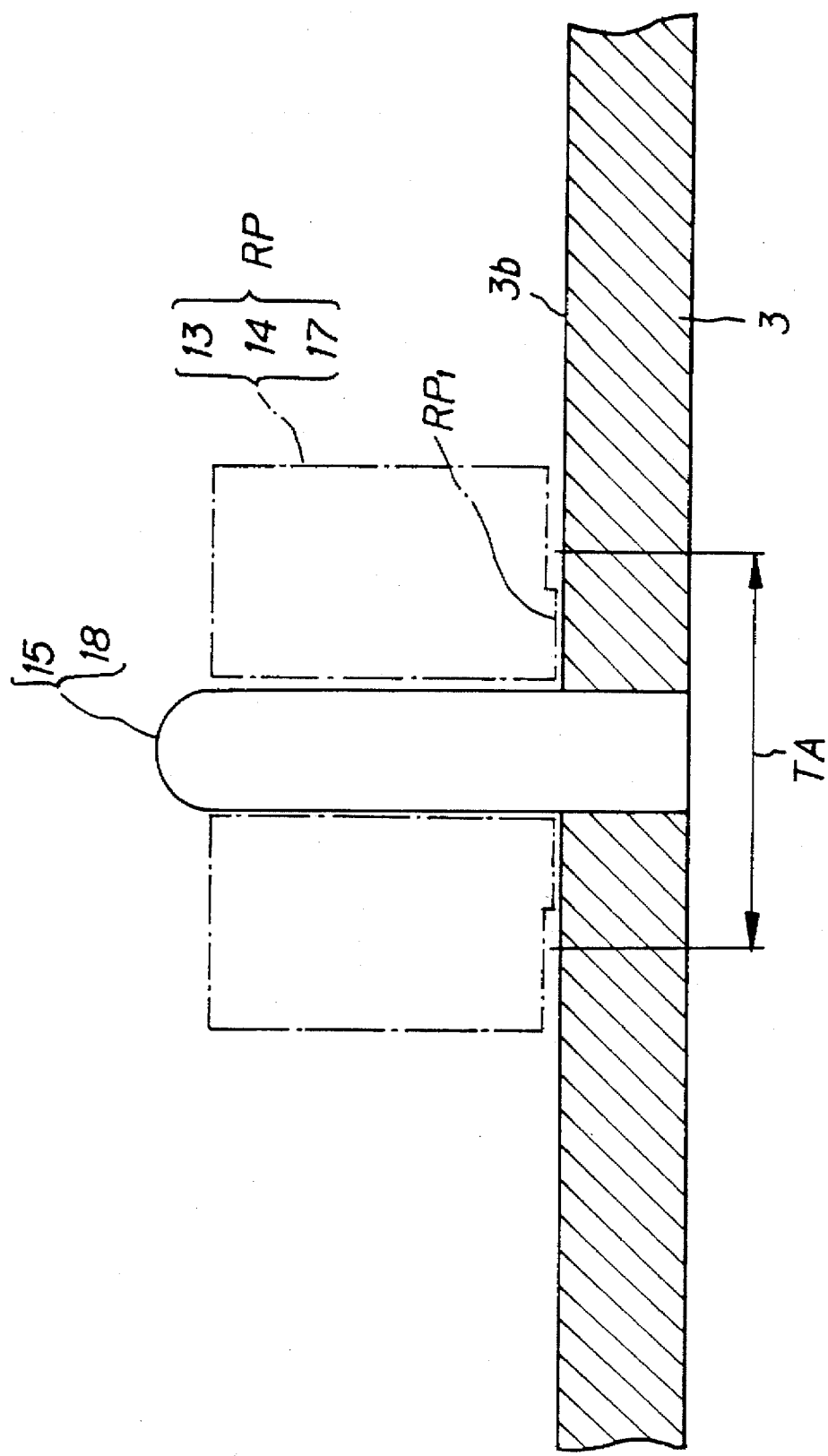
FIG. 8 is a partial enlarged sectional side view of a related art base plate illustrating a base contact area of a rotating part in the upper surface of the base plate.
Figure 9:
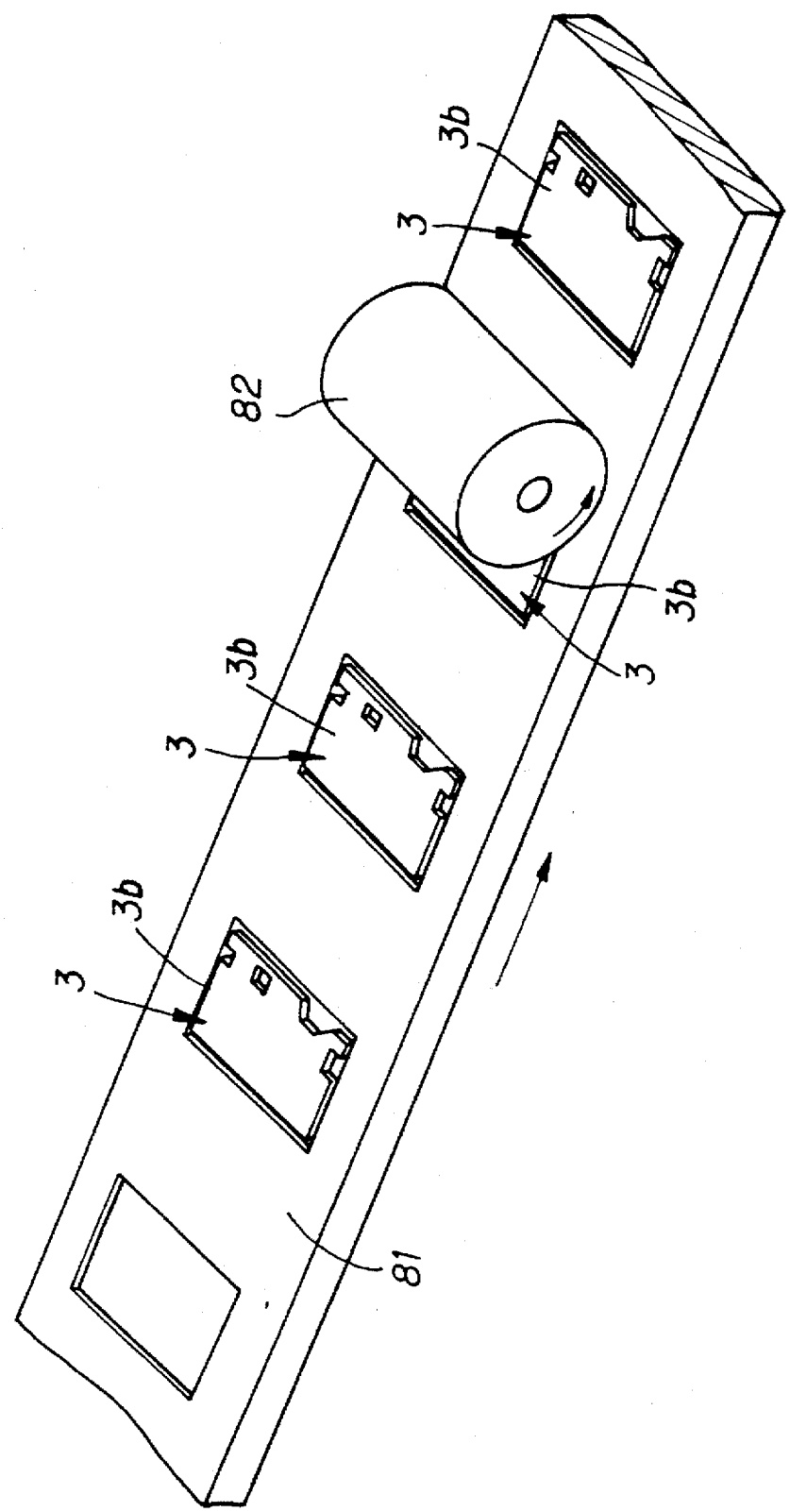
FIG. 9 is a perspective view illustrating a step of grinding (polishing) upper surfaces of base plates.
Figure 10:
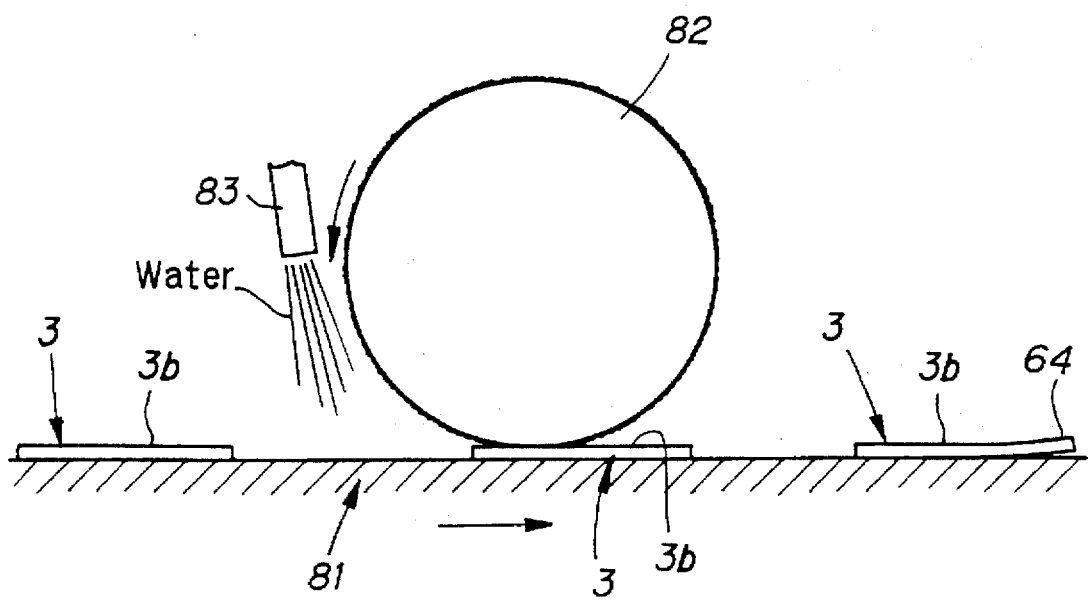
FIG. 10 is a side view of a main part of FIG. 9.
Figure 11:
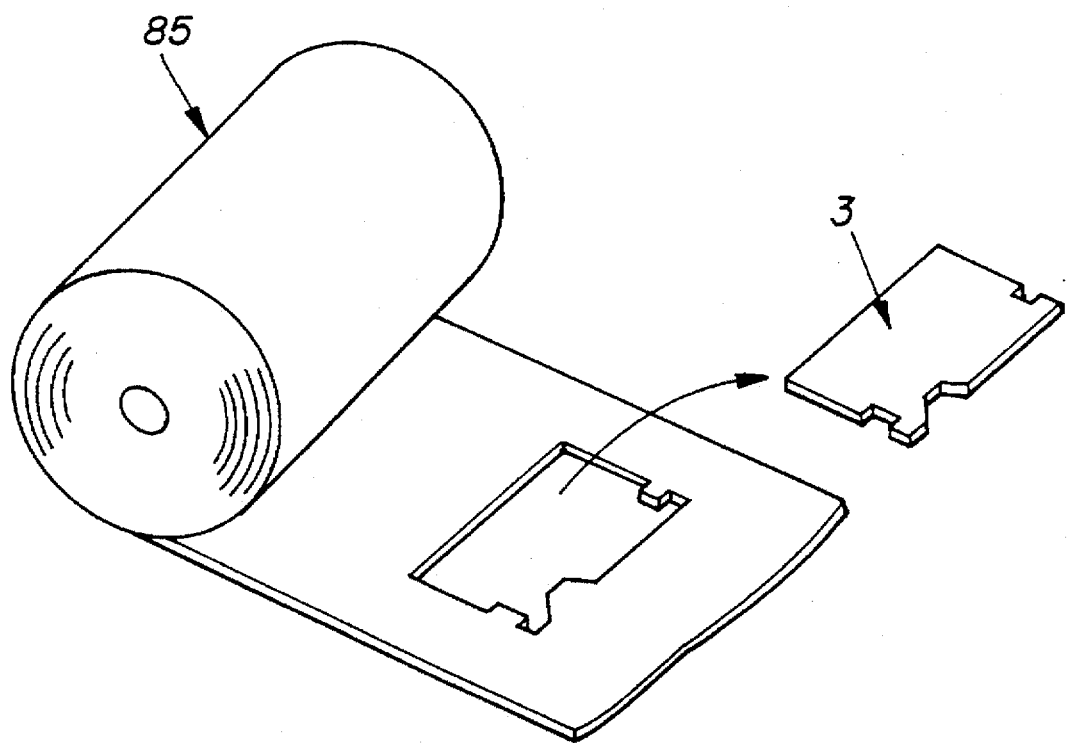
FIG. 11 is a perspective view illustrating a step of punching base plates from a pre-alumited material already treated with alumite or a coated aluminum material.
Figure 12A:
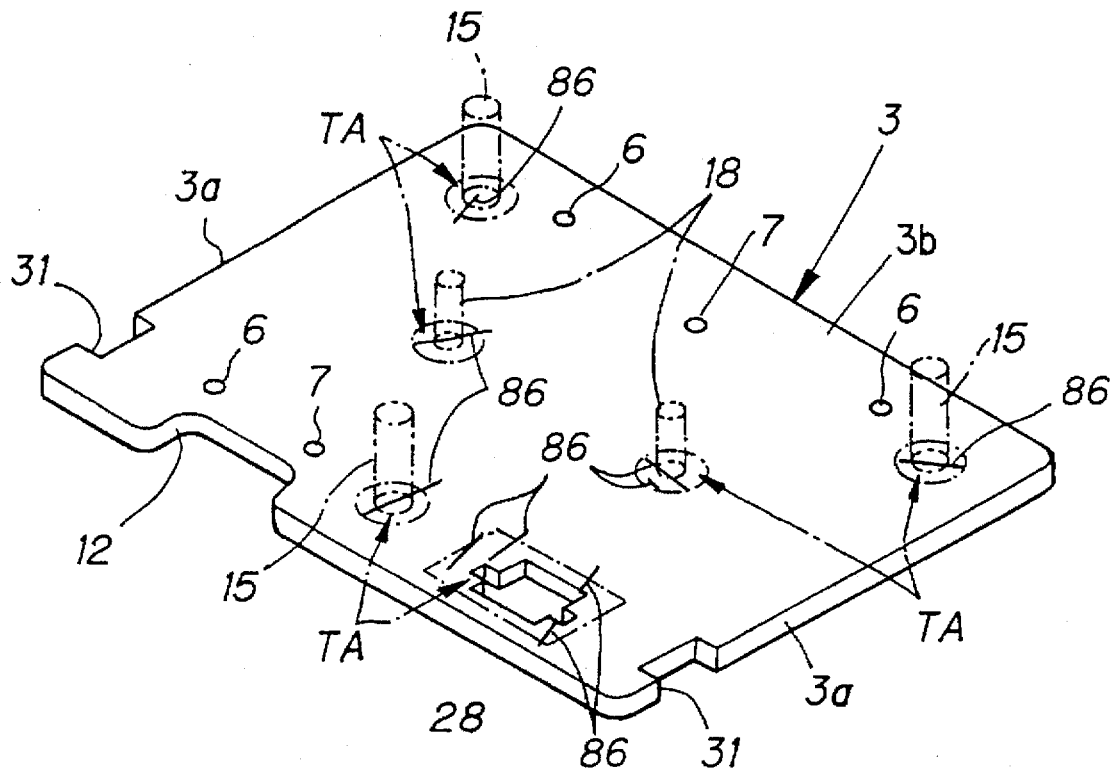
FIG. 12A and FIG. 12B are a perspective view and a partial enlarged sectional side view of a whole base plate illustrating scratch projections in the upper surface of the base plate.
Figure 12B:
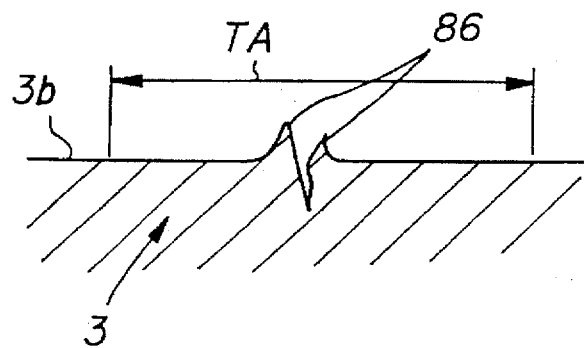
Figure 13:
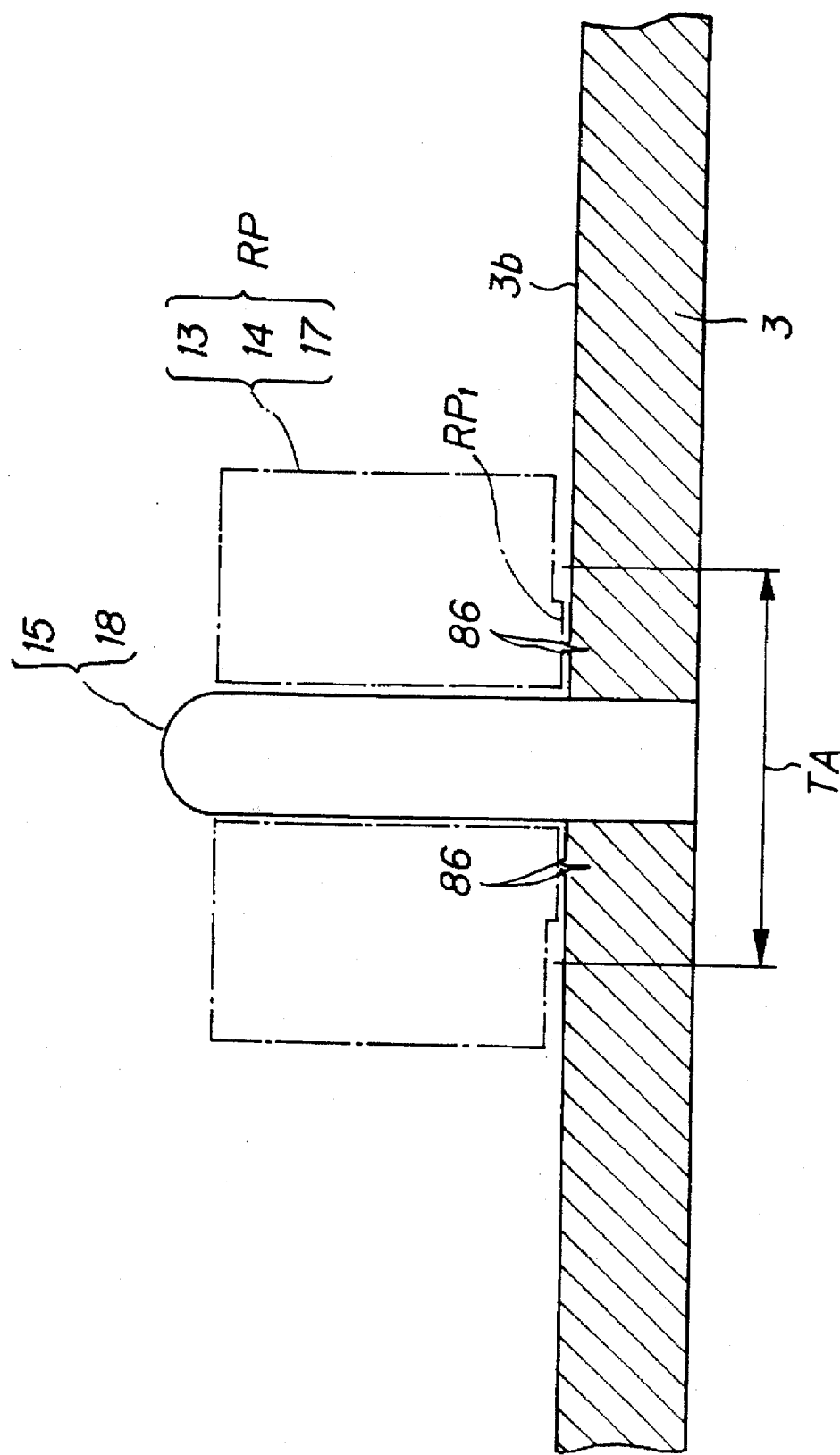
FIG. 13 is a partial enlarged sectional side view of a base plate illustrating the relationship between a base contact area of a rotating part and scratch projections in the upper surface of the base plate.
Figure 14:
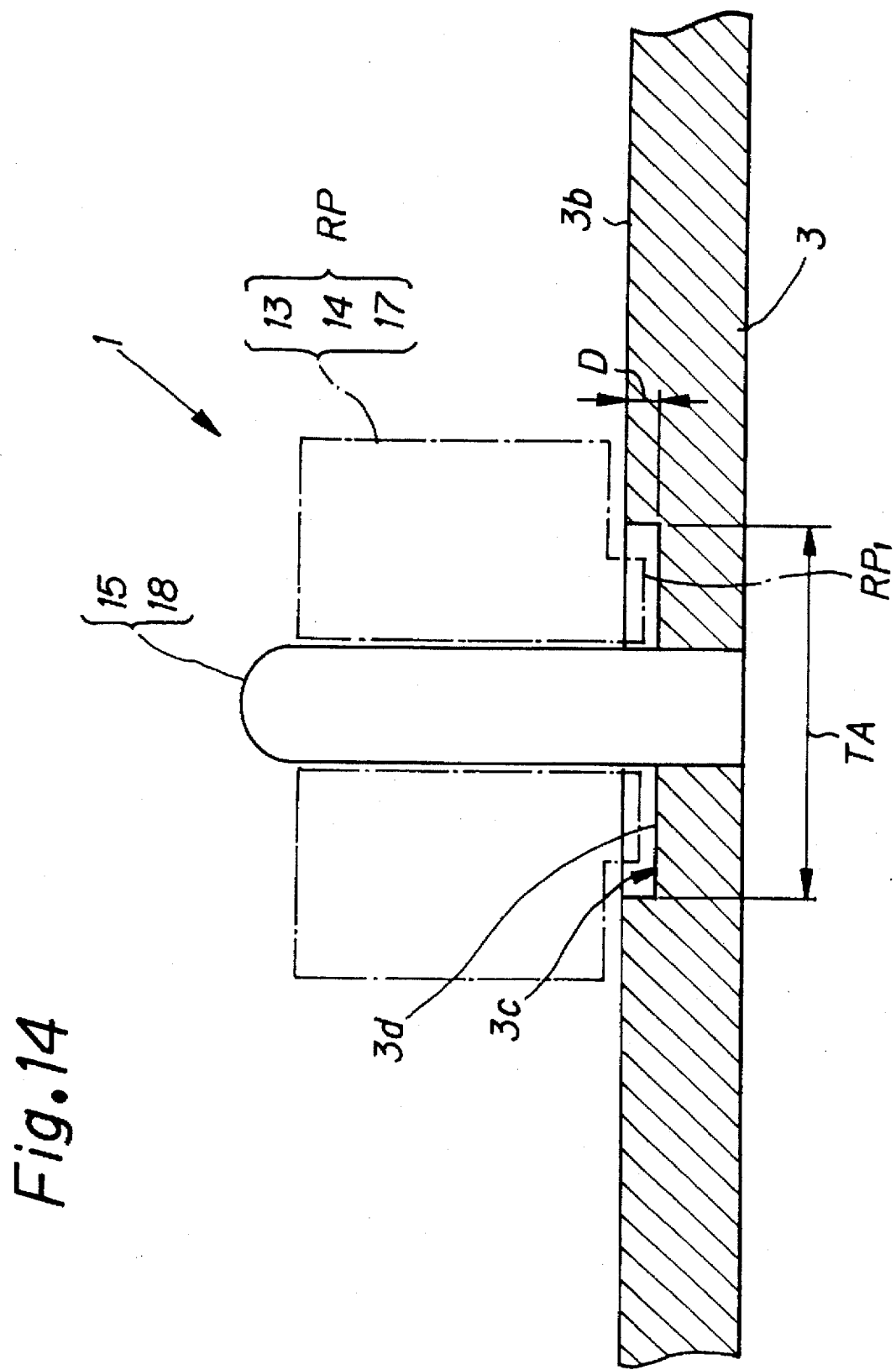
FIG. 14 is an enlarged sectional side view of part of a base plate illustrating a recess formed by partially surface-pressing the upper surface of the base plate in a preferred embodiment of a data cartridge to which the invention has been applied.

Next, using the forging press 61 described with reference to FIG. 7, as shown in FIG. 14, a plurality of support shafts 15 and 18 are embedded in the centers of predetermined recesses 3c among the plurality of recesses 3c of the base plate 3 and at the same time a plurality of tape guides 19 and 20 and a pivot shaft 25 are also embedded at once in predetermined positions in the base plate 3.

After this, as shown in FIG. 14, a plurality of rotating parts RP and other mechanism parts MP are assembled to the base plate 3, and particularly the base contact surfaces $RP_1$ of the lower ends of a plurality of rotating parts RP and mechanism parts MP such as the drive roller 13, the corner rollers 14, the tape reels 17 and the mirror 27 are brought into base contact with the plurality of recesses 3c.

DESCRIPTION OF BASE PLATE SURFACE-PRESSING PROCESS

Next, a method of partially surface-pressing the upper surface 3b of the base plate 3 will be described.

Figure 16A:
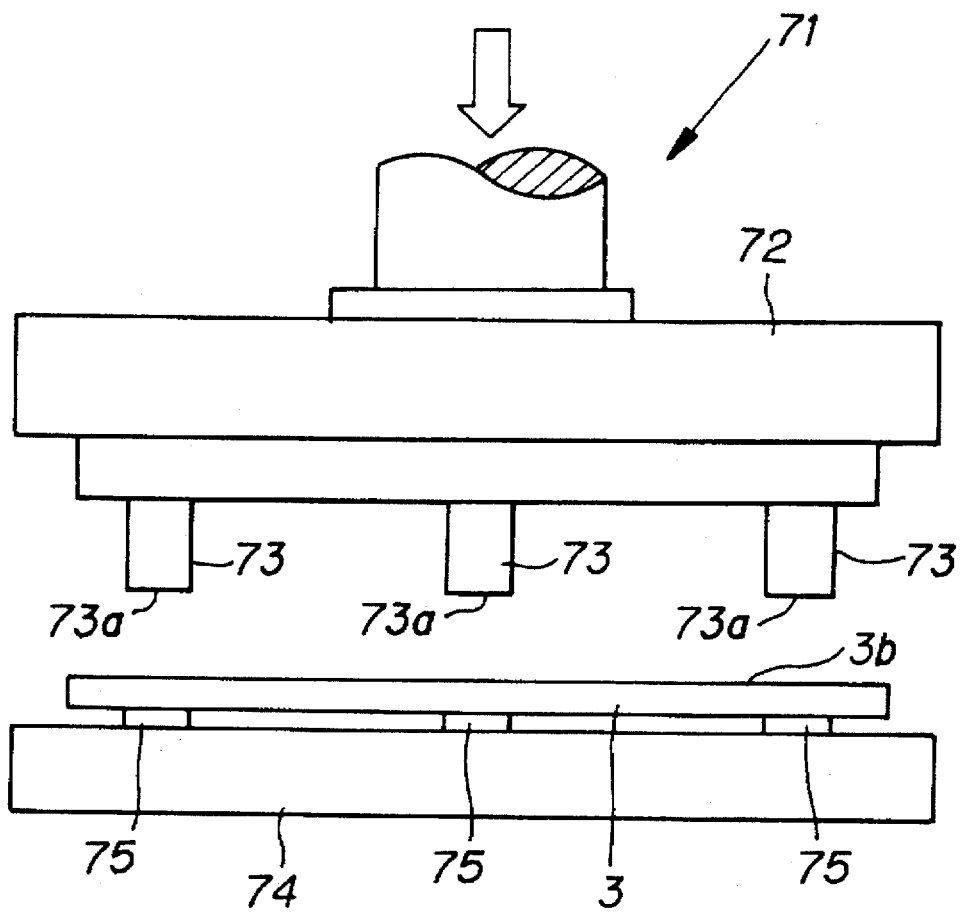
FIG. 16A and FIG. 16B are a side view of a press for carrying out a partial surface-pressing process on the upper surface of a base plate and a sectional side view of a base plate on which a partial surface-pressing process has been carried out by this press.
Figure 16B:
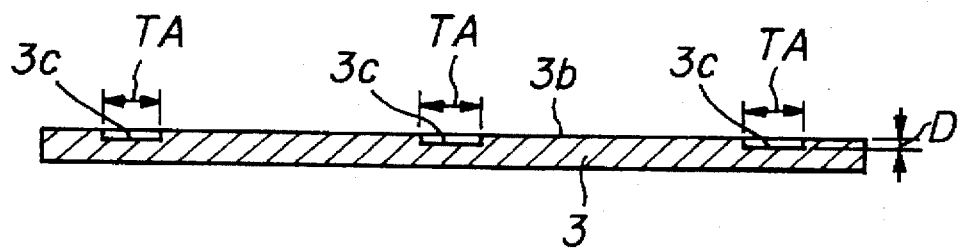

In this surface-pressing process, a press 71 shown in FIG. 16 is used; a plurality of punches 73 are vertically attached to the underside of a press proper 72, and horizontal lower end surfaces 37a of these punches 73 are finished as mirror surfaces. A plurality of bearers 75 are disposed directly underneath the punches 73, and the base plate 3 is placed horizontally on these bearers 75.

The punches 73 are then driven downward onto the upper surface 3b of the base plate 3 by the press proper 72 simultaneously and with a predetermined pressure, and a plurality of base contact areas TA of a plurality of rotating parts RP and other mechanism parts MP such as the drive roller 13, the corner rollers 14, the tape reels 17 and the mirror 27 in the upper surface 3b of the base plate 3 are partially and simultaneously surface-pressed and recesses 3c each of a uniform depth D are thereby formed at once in these base contact areas TA.

Therefore, with this press 71, because it is possible to simultaneously surface-press a plurality of base contact areas TA in the upper surface 3b of the base plate 3, these base contact areas TA can be processed into smooth surfaces 3d, which will be further discussed later, in one pressing step, in an extremely short time and very simply. At this time, because the bearers 75 are disposed directly underneath the portions of the base plate 3 pressurized by the punches 73, deformation of the base plate 3 during pressing thereof can be prevented.

The areas of the recesses 3c simultaneously formed in the upper surface 3b of the base plate 3 in this way are set to be equal to or greater than the respective base contact areas of the rotating parts RP and other mechanism parts MP with respect to the base plate 3, and the areas of the lower end surfaces 73a of the punches 73 are set to match the respective areas of the recesses 3c.

Figure 17A:
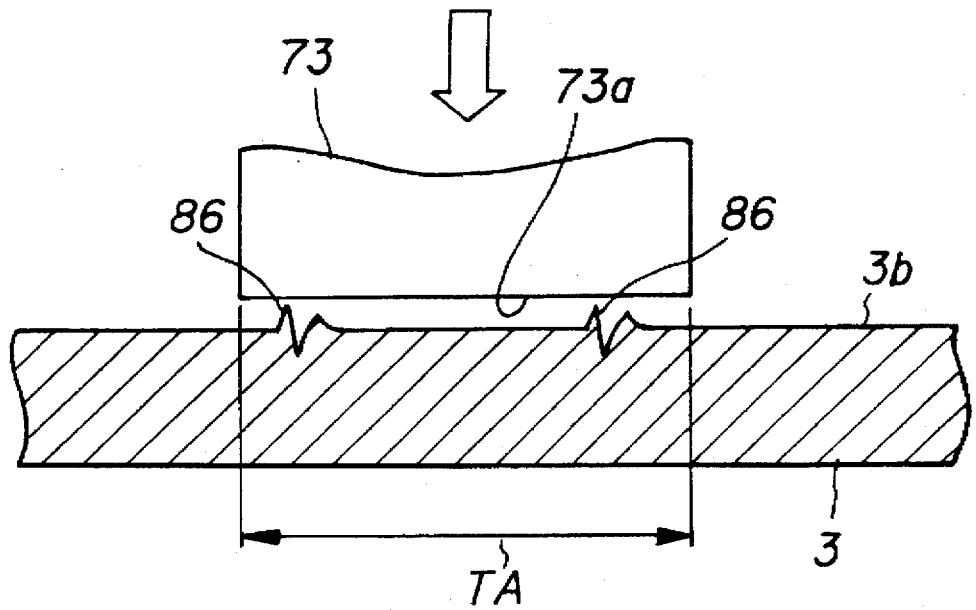
FIG. 17A and FIG. 17B are enlarged sectional side views illustrating how scratch projections are squashed and a smooth surface is formed by a process of partially surface-pressing a base plate using punches of the press.
Figure 17B:
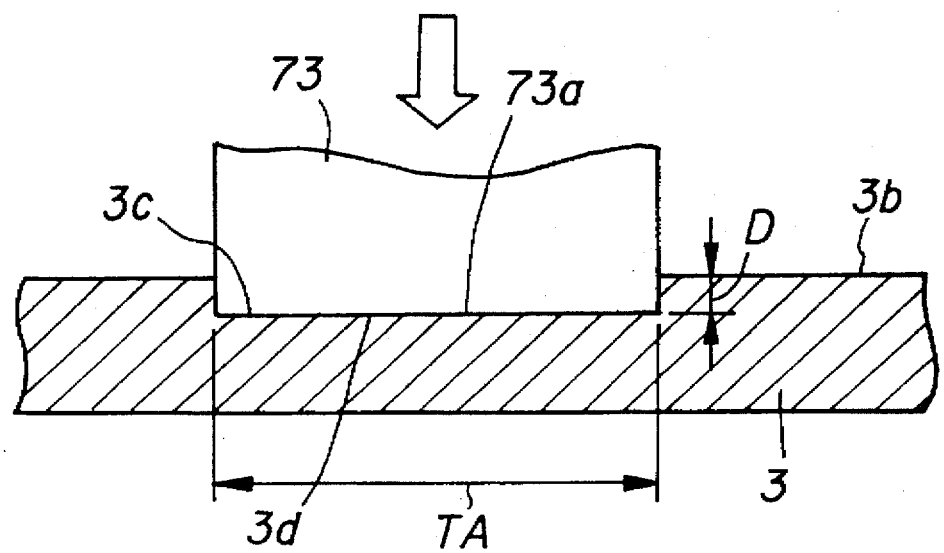

Accordingly, even if there are scratch projections 86 in the base contact areas TA in the upper surface 3b of the base plate 3, as shown in FIG. 17A, during the surface-pressing process using the punches 73 the lower end surfaces 73a of the punches 73 squash the scratch projections 86, as shown in FIG. 17B, and it is possible to form smooth surfaces 3d in these base contact areas TA wherein there are absolutely no fine irregularities.

In the smooth surfaces 3d formed by this kind of surface-pressing process, a surface quality such that the surface roughness is equal to or better than about 0.01 to 0.03 μm by Ra can be obtained.

Furthermore, because as a result of the base contact areas TA being formed in recesses 3c of depth D scratch projections 66 do not readily form in these recesses 3c in subsequent steps of carrying the base plates 3, embedding the support shafts 15 and 18 and parts assembly, stable quality can be ensured.

Moreover, when after this surface-pressing step the support shafts 15 and 18 are embedded in the centers of predetermined recesses 3c, as shown in FIG. 14, these support shafts 15 and 18 themselves become obstructions and further reduce scratching of the insides of the recesses 3c in which these support shafts 15 and 18 are embedded, and it is possible to supply base plates 3 of excellent quality.

SMOOTH ROTATION OF THE ROTATING PARTS

As shown in FIG. 14, by fitting rotating parts RP such as the drive roller 13, the corner rollers 14 and the tape reels 17 to the support shafts 15 and 18, the base contact surfaces $RP_1$ of these rotating parts RP can be brought into base contact with smooth surfaces 3d of the recesses 3c wherein there are absolutely no scratch projections 86 and smooth rotation of these rotating parts RP can thereby be ensured.

Also with respect to mechanism parts MP such as the mirror 27, these can be brought into contact with smooth surfaces 3d of the recesses 3c and quality of the contact of these mechanism parts MP with respect to the base plate 3 can also thereby be ensured.

Thus, with this invention, it is possible to supply high-quality data cartridges 1.

In particular, in the case of a manufacturing method wherein base plates are directly punched from a starting sheet already treated with alumite or having a protective layer coated on its surface and cost can therefore be reduced, even when scratching has occurred, it has been difficult to repair this scratching by polishing or the like in a later step because the protective layer would peel off. However, because by forming recesses by means of a partial surface-pressing step of the kind disclosed in this application it is possible to remove scratches without the protective layer coming off, as a result a base plate having no scratches can be realized with a low-cost manufacturing process.

A preferred embodiment of the invention has been described above, but the invention is not limited to this preferred embodiment and various changes are possible on the basis of the technological concept of the invention.

Also, the step of forming a plurality of recesses 3c by partially surface-pressing base contact areas TA of the upper surface 3b of the base plate 3 can be carried out before or after the step of embedding the support shafts 15 and 18 and the like in the base plate 3 or can be carried out at the same time as this embedding step.

A data cartridge of the invention constructed as described above provides the following benefits.

With a data cartridge according to a first aspect of the invention, even if there are scratch projections in a plurality of base contact areas of a plurality of rotating parts and other mechanism parts in the upper surface of a base plate, by partially surface-pressing these base contact areas and thereby forming a plurality of recesses, the scratch projections can be squashed and smooth surfaces can thereby be formed in the base contact areas, scratch projections do not readily form in the plurality of recesses formed in the plurality of base contact areas after that, and stable quality can therefore be ensured; as a result, smooth rotation of rotating parts mounted on the base plate and making base contact therewith and good contact quality of other mechanism parts with respect to the base plate can be secured and high-precision mounting of these rotating parts RP and other mechanism parts MP can be carried out. Consequently, a stable tape path and smooth transport of the magnetic tape can be obtained, recording and reproduction errors can be completely prevented and a highly reliable data cartridge can be obtained.

Also, according to the first aspect of the invention, because by partially surface-pressing a plurality of base contact areas of a plurality of rotating parts and other mechanism parts in the upper surface of a base plate to form a plurality of recesses smooth surfaces with no scratch projections are formed in these base contact areas, it is possible to dispense with a conventionally performed step of surface grinding (polishing) upper surfaces of base plates one by one with a rotary grindstone, which is troublesome and involves heavy consumption of the grindstone, and it is possible to realize shortening of the processing time and large-scale cost reduction.

According to a second aspect of the invention, because a plurality of base contact areas in the upper surface of a base plate are simultaneously surface-pressed by a press having a plurality of punches, these base contact areas can be processed to a smooth surface with one pressing step in an extremely short time and very simply.

According to a third aspect of the invention, because the areas of the plurality of recesses made by surface-pressing the upper surface of the base plate are set to a size equal to or greater than the respective base contact areas of the plurality of rotating parts and other mechanism parts, reliability with respect to the provision of smooth rotation of the rotating parts and good contact quality of other mechanism parts with respect to the base plate is high and a data cartridge of superior quality can be obtained.

What is claimed is:

1. A tape cartridge containing a pair of tape reels on which a tape is wound, comprising:

a metal base plate and an upper cover;

a tape guide fixed to the metal base plate; and a roller slidably rotatably mounted on the metal base plate, wherein the metal base plate is provided with recesses formed by partially surface-pressing contact areas of the metal base plate with which the tape guide and the roller make contact.

2. A tape cartridge according to claim 1 wherein:

the recesses are wider than the contact areas.

3. A tape cartridge according to claim 2 wherein:

a protective layer is provided on the surface of the metal base plate.

4. A tape cartridge containing a pair of tape reels on which a tape is wound, comprising:

a metal base plate and an upper cover;

a drive belt for frictionally driving the tape wound on the pair of tape reels;

a drive roller for engaging with a tape cartridge drive capstan and driving the drive belt slidably rotatably mounted on the metal base plate; and a plurality of belt guide rollers for guiding the drive belt slidably rotatably mounted on the metal base plate, the pair of tape reels being slidably rotatably mounted on the metal base plate, wherein the metal base plate is provided with recesses formed by partially surface-pressing sliding contact areas of the metal base plate with which the drive roller, the belt guide rollers and the tape reels slidably rotatably mounted on the metal base plate make sliding contact.

5. A tape cartridge containing a pair of tape reels on which a tape is wound, comprising:

a metal base plate and an upper cover;

a drive belt for frictionally driving the tape wound on the pair of tape reels;

a drive roller for engaging with a tape cartridge drive capstan and driving the drive belt slidably rotatably mounted on the metal base plate;

a plurality of belt guide rollers for guiding the drive belt slidably rotatably mounted on the metal base plate;

a plurality of tape guides fixed by press-fitting to the metal base plate for guiding the tape so that the tape is exposed through an opening provided in the upper cover; and a mirror fixed in contact with the metal base plate for guiding a beam of light for detecting a detection part provided on the tape, the pair of tape reels being slidably rotatably mounted on the metal base plate, wherein the metal base plate is provided with recesses formed by partially surface-pressing sliding contact areas of the metal base plate with which the drive roller, the belt guide rollers and the tape reels slidably rotatably mounted on the metal base plate make sliding contact and contact areas of the metal base plate with which the tape guides and the mirror fixed by press-fitting to the metal base plate make contact.

* * * * *